United States Patent
Cho

(10) Patent No.: US 11,162,811 B2
(45) Date of Patent: Nov. 2, 2021

(54) METHOD OF CONTROLLING PLATOONING OF VEHICLES ACCORDING TO WIND DIRECTION AND CONTROL SERVER FOR IMPLEMENTING THE SAME

(71) Applicant: LG Electronics Inc., Seoul (KR)

(72) Inventor: Jaejin Cho, Seoul (KR)

(73) Assignee: LG Electronics Inc., Seoul (KR)

(*) Notice: Subject to any disclaimer, the term of this patent is extended or adjusted under 35 U.S.C. 154(b) by 136 days.

(21) Appl. No.: 16/556,375

(22) Filed: Aug. 30, 2019

(65) Prior Publication Data

US 2019/0383638 A1 Dec. 19, 2019

(30) Foreign Application Priority Data

Aug. 6, 2019 (KR) .................. 10-2019-0095482

(51) Int. Cl.
 *G01C 21/36* (2006.01)
 *G05D 1/02* (2020.01)
(52) U.S. Cl.
 CPC ....... *G01C 21/3697* (2013.01); *G05D 1/0221* (2013.01); *G05D 1/0223* (2013.01); *G05D 1/0293* (2013.01); *G05D 1/0295* (2013.01)
(58) Field of Classification Search
 CPC ............ G01C 21/3697; G05D 1/0295; G05D 1/0223; G05D 1/0221; G05D 1/0293; G05D 2201/0213; G08G 1/096783; G08G 1/22; G08G 1/096791; B60W 30/18163; B60W 2552/30; B60W 2556/65; B60W 2555/20; B60W 50/0097; B60W 2530/10; B60W 2552/15; B60W 2520/10;
(Continued)

(56) References Cited

U.S. PATENT DOCUMENTS

| | | | |
|---|---|---|---|
| 9,799,224 B2 | 10/2017 | Okamoto | |
| 2018/0065485 A1* | 3/2018 | Koehler | ............ G07C 5/085 |
| 2018/0283888 A1* | 10/2018 | Smith | ............ G05D 1/0223 |

(Continued)

FOREIGN PATENT DOCUMENTS

| | | |
|---|---|---|
| JP | 2009157794 | 7/2009 |
| JP | 2016149044 | 8/2016 |

(Continued)

OTHER PUBLICATIONS

Korean Office Action in Korean Appln. No. 10-2019-0095482, dated Jun. 17, 2020, 12 pages (with English translation).

(Continued)

*Primary Examiner* — Rodney A Butler
(74) *Attorney, Agent, or Firm* — Fish & Richardson P.C.

(57) ABSTRACT

Disclosed are a method of controlling platooning according to a wind direction and a control server for implementing the same. The disclosed control server includes a communication unit configured to communicate with two or more autonomous vehicles which travel in a platoon, a memory configured to store one or more instructions, and a processor configured to execute the instructions. The communication unit receives a power loss value from a leading vehicle among the two or more vehicles and receives information about a direction of wind around the two or more vehicles from at least one vehicle among the two or more vehicles or an external server.

18 Claims, 16 Drawing Sheets

(58) Field of Classification Search
CPC . B60W 2510/0638; B60W 2510/1005; B60W 60/0023; B60W 40/1005; B60W 30/165
See application file for complete search history.

(56) References Cited

U.S. PATENT DOCUMENTS

| | | |
|---|---|---|
| 2019/0049996 A1 | 2/2019 | Aikin et al. |
| 2019/0051158 A1* | 2/2019 | Felip Leon .......... G05D 1/0088 |
| 2019/0179338 A1 | 6/2019 | Kim |
| 2020/0011687 A1* | 1/2020 | Lindemann ........... B60W 40/00 |

FOREIGN PATENT DOCUMENTS

| | | |
|---|---|---|
| JP | 2017170921 | 9/2017 |
| KR | 20180111099 | 10/2018 |
| KR | 20190069989 | 6/2019 |

OTHER PUBLICATIONS

Korean Notice of Allowance in Korean Appln. No. 10-2019-0095482, dated Aug. 27, 2020, 7 pages (with English translation).

* cited by examiner

700

METHOD OF CONTROLLING PLATOONING OF VEHICLES ACCORDING TO WIND DIRECTION AND CONTROL SERVER FOR IMPLEMENTING THE SAME

CROSS-REFERENCE TO RELATED APPLICATION

This application claims priority to and the benefit of Korean Patent Application No. 10-2019-0095482, filed on Aug. 6, 2019, the disclosure of which is incorporated herein by reference in its entirety.

BACKGROUND

1. Field of the Invention

The present invention relates to a technique related to a method of controlling platooning of vehicles according to a wind direction and a control server for implementing the same.

2. Discussion of Related Art

Vehicles are devices which are moved by users on board in desired directions. A representative example of the vehicle may include an automobile.

For the convenience of a user using a vehicle, various types of sensors, electronic devices, and the like are attached to the vehicle. In particular, for the convenience of the user's driving, research on an advanced driver assistance system (ADAS) is being actively conducted. Furthermore, research and development on a vehicle driving system that allows a vehicle to autonomously travel is being actively conducted.

As autonomous vehicles that autonomously travel have been developed, a plurality of autonomous vehicles may form one group to perform platooning. The one group may include one leading vehicle which provides a control signal and one or more following vehicles which are controlled by the control signal.

Meanwhile, when pluralities of autonomous vehicles perform platooning on a highway, there is a need to efficiently adjust an arrangement of the vehicles in a platoon in order to improve fuel efficiency.

SUMMARY OF THE INVENTION

The present invention is directed to providing a method of controlling platooning in which, in order to improve fuel efficiency of a plurality of autonomous vehicles which perform platooning, an arrangement of the vehicles in a platoon is efficiently changed on the basis of a wind direction, a road type, and the like, and a control server for implementing the same.

Objects of the present invention are not limited to the above-mentioned objects and other objects and advantages of the present invention which are not mentioned can be understood by the following description and more clearly understood by the embodiments of the present invention. It will also be easily apparent that the objects and advantages of the present invention may be realized and attained by means of the instrumentalities and combinations particularly pointed out in the appended claims.

According to an aspect of the present invention, there is provided a control server for controlling two or more autonomous vehicles which perform platooning including a communication unit configured to communicate with the two or more vehicles, a memory configured to store one or more instructions, and a processor configured to execute the instructions. The communication unit receives a power loss value from a leading vehicle among the two or more vehicles and receives information about a direction of wind around the two or more vehicles from at least one vehicle among the two or more vehicles or an external server. When the power loss value is greater than or equal to a preset threshold value, the processor predicts a direction of wind at a subsequent time point on the basis of the received wind direction and a type of road on which the two or more vehicles travel and generates a control instruction for controlling an arrangement of the two or more vehicles in the platoon on the basis of the predicted wind direction. The communication unit transmits the control instruction to the two or more vehicles.

According to another aspect of the present invention, there is provided a method of controlling platooning of two or more autonomous vehicles, which includes receiving, by the communication unit, vehicle state information of the two or more vehicles, determining, by the processor, a leading vehicle among the two or more vehicles on the basis of the vehicle state information, receiving, by the communication unit, a power loss value from the leading vehicle, receiving information about a direction of wind around the two or more vehicles from at least one vehicle of the two or more vehicles or an external server, predicting, by the processor, a wind direction at a subsequent time point on the basis of the received wind direction and a type of road on which the two or more vehicles travel, when the power loss value is greater than or equal to a preset threshold value, and generating, by the processor, a control instruction for changing an arrangement of the two or more vehicles in the platoon on the basis of the predicted wind direction.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
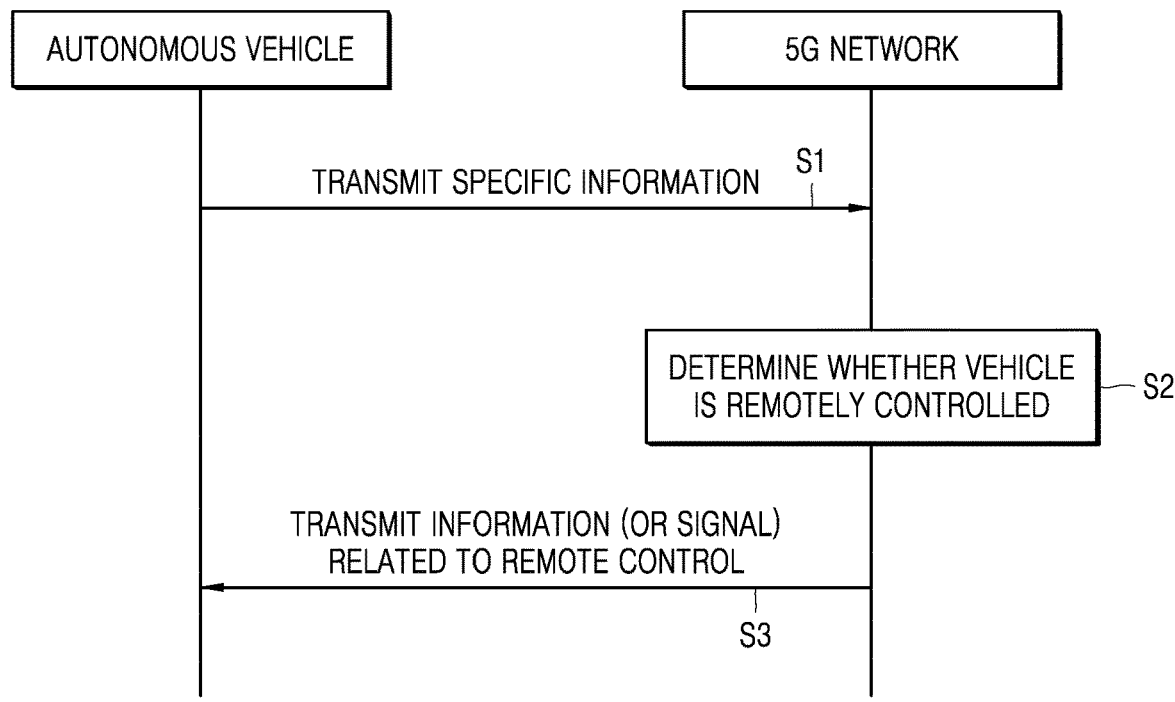
FIG. 1 is a diagram illustrating an example of a basic operation of an autonomous vehicle and a fifth generation (5G) network in a 5G communication system.

Hereinafter, embodiments that are easily performed by those skilled in the art will be described in detail with reference to the accompanying drawings. The embodiments of the present invention may be implemented in several different forms and are not limited to embodiments described herein.

Parts irrelevant to description are omitted in the drawings in order to clearly explain the present invention. Similar parts are denoted by similar reference numerals throughout this specification. In addition, some exemplary embodiments of the present invention will be described in detail with reference to the accompanying drawings. When reference numerals are assigned to components of each drawing, it should be noted that, even when the same components are illustrated in different drawings, the same numerals are assigned to the same components whenever possible. In addition, in descriptions of the present invention, when detailed descriptions of related well-known technology are deemed to unnecessarily obscure the gist of the invention, they will be omitted.

Further, in describing components of the present invention, terminologies such as "first," "second," "A," "B," "(a)," and "(b)" may be used. These terms are only used to distinguish one component from another component, but the nature, order, or number of the corresponding components is not limited by these terms. It will be understood that when an element is referred to as being "connected" or "coupled" to another element, it can be directly connected or coupled to another element, intervening elements may be present, or it can be connected or coupled to another element through still another element.

Further, in implementing of the present invention, elements may be described as being divided for convenience of description. However, these elements may be implemented in one device or module, or one element may be implemented in a plurality of devices or modules.

Meanwhile, a vehicle to which the present invention is applied may be an autonomous vehicle that can travel to a destination by itself without manipulation from a user. In this case, the autonomous vehicle may be in communication with an artificial intelligence (AI) module, a drone, an unmanned aerial vehicle, a robot, an augmented reality (AR) module, a virtual reality (VR) module, a fifth generation (5G) mobile communication device, or the like.

FIG. 1 is a diagram illustrating an example of a basic operation of an autonomous vehicle and a 5G network in a 5G communication system.

Here, autonomous driving refers to a technique for enabling a vehicle to travel by itself, and an autonomous vehicle refers to a vehicle that travels without manipulation from the user or with minimal manipulation from the user.

For example, the autonomous driving may include all of a technique for enabling the vehicle to maintain a driving lane, a technique for enabling the vehicle to automatically adjust a speed, such as adaptive cruise control, a technique for enabling the vehicle to automatically travel along a defined route, a technique for enabling the vehicle to automatically set a route when a destination is set, and the like.

The vehicles may include all of a vehicle including only an internal combustion engine, a hybrid vehicle including both of an internal combustion engine and an electric motor, and an electric vehicle including only an electric motor and may include not only an automobile but also a train, a motorcycle, and the like.

In this case, the autonomous vehicle may be a robot having an autonomous driving function.

Hereinafter, an example of a basic operation of communication between the autonomous vehicle and the 5G network will be described with reference to FIG. 1. Meanwhile, for convenience of description, the autonomous vehicle is referred to as a "vehicle."

The vehicle may transmit specific information to the 5G network (S1).

The specific information may include autonomous driving related information.

The autonomous driving related information may be information directly related to driving control of the vehicle. For example, the autonomous driving related information may include at least one of object data indicating an object around the vehicle, map data, vehicle state data, vehicle location data, and driving plan data.

The autonomous driving related information may further include service information required for autonomous driving. For example, the specific information may include information related to a destination and a safety level of the vehicle which are input through a user terminal. The 5G network may determine whether the vehicle is remotely controlled (S2).

Here, the 5G network may include a server or a module which performs remote control related to the autonomous driving.

Further, the 5G network may transmit information (or a signal) related to the remote control to the vehicle (S3). The information related to the remote control may be a signal applied directly to the vehicle and may further include service information required for autonomous driving.

According to an embodiment of the present invention, the vehicle may receive service information, such as insurance for each section and risk section information which is selected on a driving route, through a server connected to the 5G network and provide a service related to the autonomous driving using the received service information.

Hereinafter, in order to provide an insurance service applicable to each section in an autonomous driving process, essential processes (e.g., an initial access procedure and the like between an autonomous vehicle and a 5G network) for 5G communication between the vehicle and the 5G network will be schematically described with reference to FIGS. 2 to 6.

Figure 2:
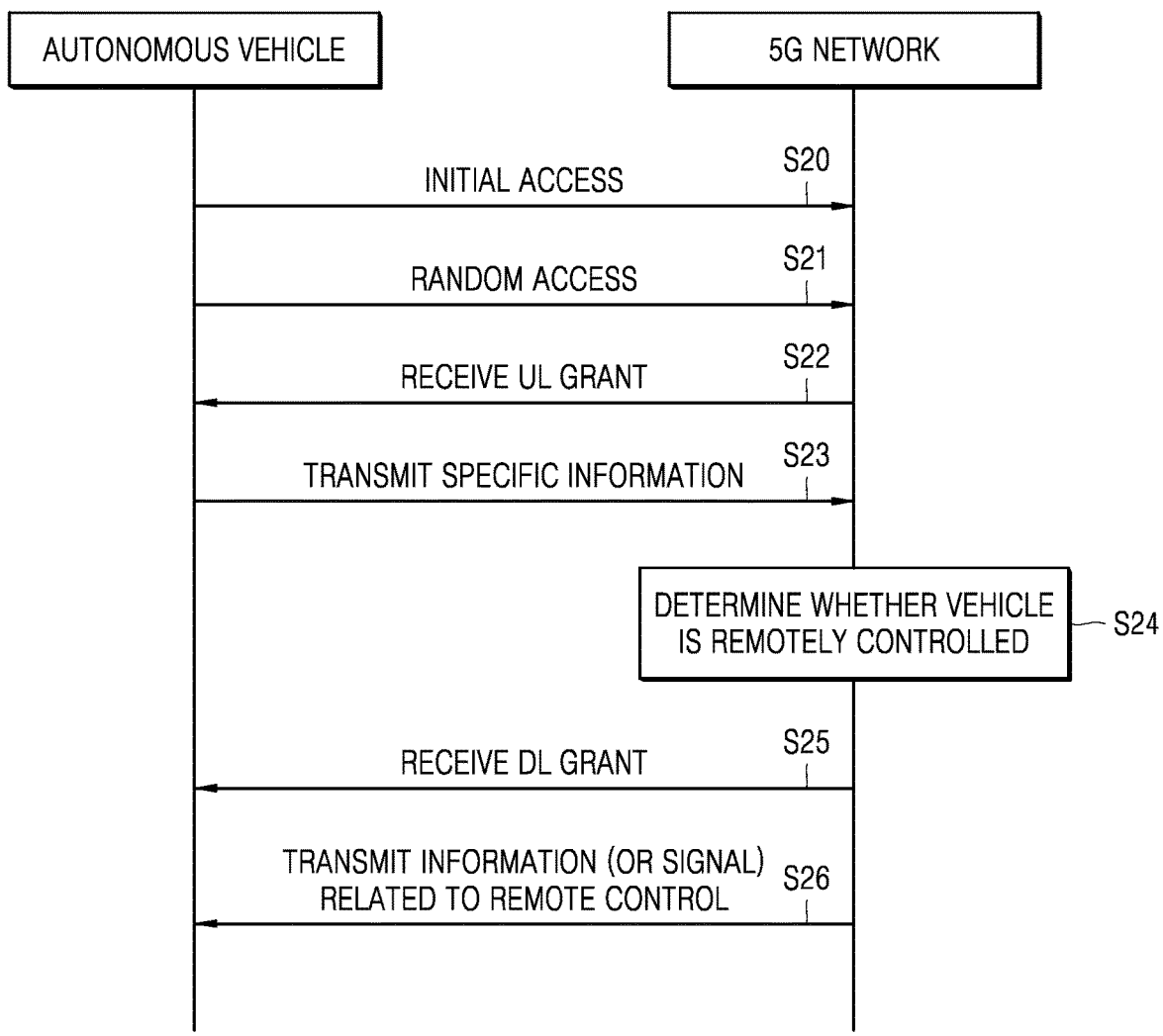
FIG. 2 is a diagram illustrating an example of an application operation of the autonomous vehicle and the 5G network in the 5G communication system.

FIG. 2 is a diagram illustrating an example of an application operation of the autonomous vehicle and the 5G network in the 5G communication system.

The vehicle may perform an initial access procedure with the 5G network (S20).

The initial access procedure may include a cell searching process, a system information obtaining process, and the like for obtaining a downlink (DL) operation.

The vehicle may perform a random access procedure with the 5G network (S21).

The random access procedure may include a preamble transmission process, a random access response reception process, and the like for obtaining uplink (UL) synchronization or transmitting UL data.

The 5G network may transmit a UL grant for scheduling transmission of specific information to the vehicle (S22).

A process of receiving the UL grant may include a process of receiving time and/or frequency resource scheduling for the transmission of the UL data to the 5G network.

The vehicle may transmit the specific information to the 5G network on the basis of the UL grant (S23).

The 5G network may determine whether the vehicle is remotely controlled (S24).

The vehicle may receive a DL grant from the 5G network through a physical DL control channel in order to receive a response with respect to the specific information (S25).

The 5G network may transmit information (or a signal) related to the remote control to the driving vehicle on the basis of the DL grant (S26).

Meanwhile, in FIG. 2, an example in which the initial access procedure and/or the random access procedure of the autonomous vehicle and the 5G communication and the DL grant reception procedure are combined is described using operations S20 to S26, but the present invention is not limited thereto.

For example, the initial access procedure and/or the random access procedure may be performed using operations S20, S22, S23, S24, and S26. Further, the initial access procedure and/or the random access procedure may be performed using operations S21, S22, S23, S24, and S26. Further, a process of combining an A1 operation and the DL grant reception procedure may be performed using operations S23, S24, S25, and S26.

Further, the operation of the vehicle performing autonomous driving is described as being controlled using operations S20 to S26, but the present invention is not limited thereto.

For example, the operation of the autonomous vehicle may be performed by selectively combining operations S20, S21, S22, and S25 with operations S23 and S26. Further, the operation of the autonomous vehicle may include operations S21, S22, S23, and S26. Further, the operation of the autonomous vehicle may include operations S20, S21, S23, and S26. Further, the operation of the autonomous vehicle may include operations S22, S23, S24, and S26.

FIGS. 3 to 6 are diagrams illustrating examples of operations of an autonomous vehicle using 5G communication.

Figure 3:
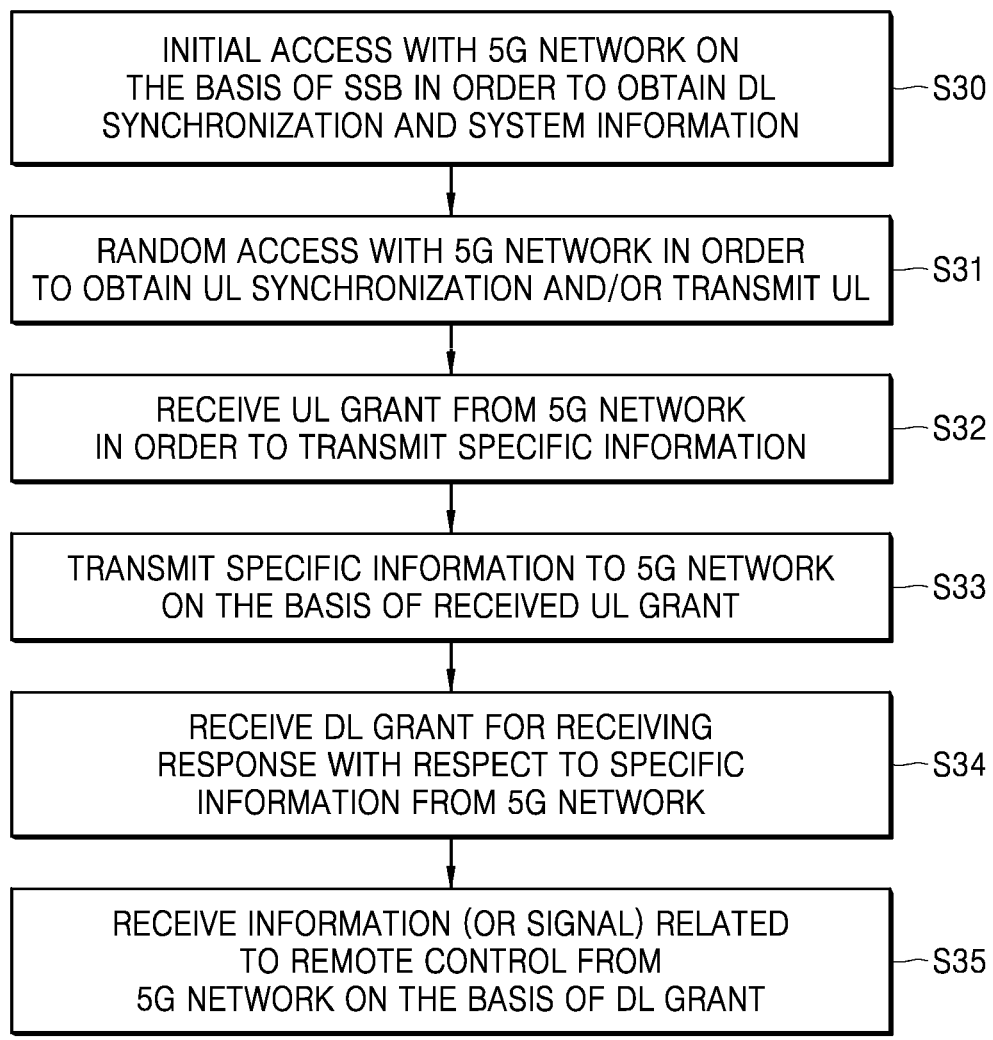
FIGS. 3 to 6 are diagrams illustrating examples of operations of an autonomous vehicle using 5G communication.

Referring to FIG. 3, a vehicle including an autonomous driving module may perform an initial access procedure with a 5G network on the basis of a synchronization signal block (SSB) in order to obtain DL synchronization and system information (S30).

The vehicle may perform a random access procedure with the 5G network in order to obtain UL synchronization and/or transmit an UL (S31).

The vehicle may receive a UL grant from the 5G network in order to transmit specific information (S32).

The vehicle may transmit the specific information to the 5G network on the basis of the UL grant (S33).

The vehicle may receive a DL grant for receiving a response with respect to the specific information from the 5G network (S34).

The vehicle may receive information (or a signal) related to remote control from the 5G network on the basis of the DL grant (S35).

In operation S30, a beam management (BM) process may be added. Further, in operation S31, a beam failure recovery process related to physical random access channel (PRACH) transmission may be added. Further, in operation S32, a quasi co-location (QCL) relationship with respect to a beam reception direction of a physical downlink control channel (PDCCH) including the UL grant may be added. Further, in operation S33, a QCL relationship with respect to a beam transmission direction of a physical uplink control channel (PUCCH) and/or a physical uplink shared channel (PUSCH) including the specific information may be added. Further, in operation S34, a QCL relationship with respect to a beam reception direction of the PDCCH including the DL grant may be added.

Figure 4:
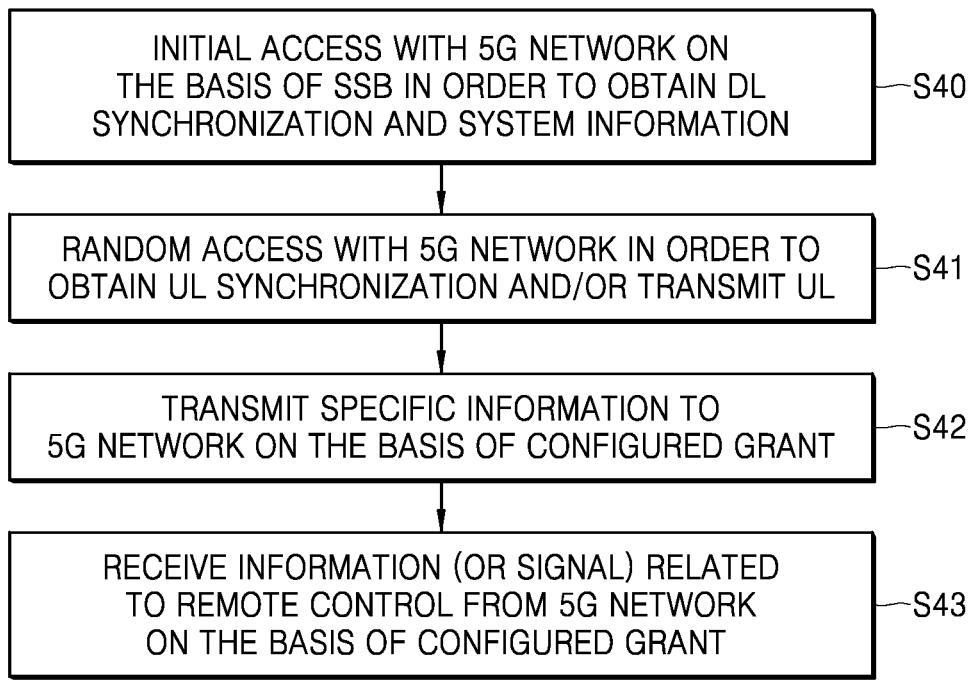

Referring to FIG. 4, a vehicle may perform an initial access procedure with a 5G network on the basis of an SSB in order to obtain DL synchronization and system information (S40).

The vehicle may perform a random access procedure with the 5G network in order to obtain UL synchronization and/or transmit an UL (S41).

The vehicle may transmit specific information to the 5G network on the basis of a configured grant (S42). In other words, instead of the process of receiving the UL grant from the 5G network, the vehicle may transmit the specific information to the 5G network on the basis of the configured grant.

The vehicle may receive information (or the signal) related to remote control from the 5G network on the basis of the configured grant (S43).

Figure 5:
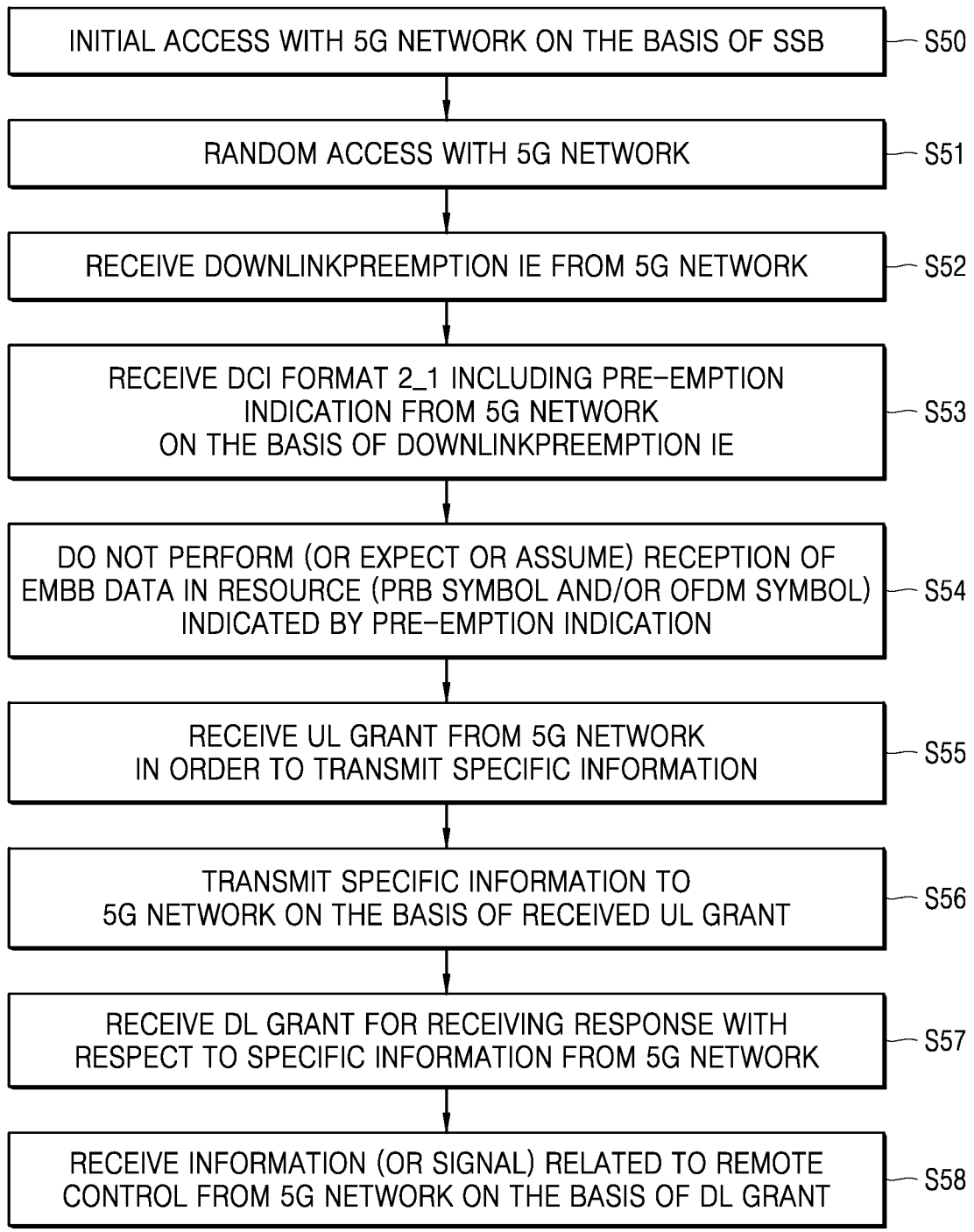

Referring to FIG. 5, a vehicle may perform an initial access procedure with the 5G network on the basis of an SSB in order to obtain DL synchronization and system information (S50).

The vehicle may perform a random access procedure with the 5G network in order to obtain UL synchronization and/or transmit an UL (S51).

The vehicle may receive DownlinkPreemption IE from the 5G network (S52).

The vehicle may receive downlink control information (DCI) format 2_1 including pre-emption indication from the 5G network on the basis of the DownlinkPreemption IE (S53).

The vehicle may not perform (or expect or assume) reception of Enhanced Mobile Broadband (eMBB) data in a resource (a physical resource block (PRB) symbol and/or an orthogonal frequency division multiplexing (OFDM) symbol) indicated by the pre-emption indication (S54).

The vehicle may receive a UL grant from the 5G network in order to transmit specific information (S55).

The vehicle may transmit the specific information to the 5G network on the basis of the UL grant (S56).

The vehicle may receive a DL grant for receiving a response with respect to the specific information from the 5G network (S57).

The vehicle may receive information (or the signal) related to remote control from the 5G network on the basis of the DL grant (S58).

Figure 6:
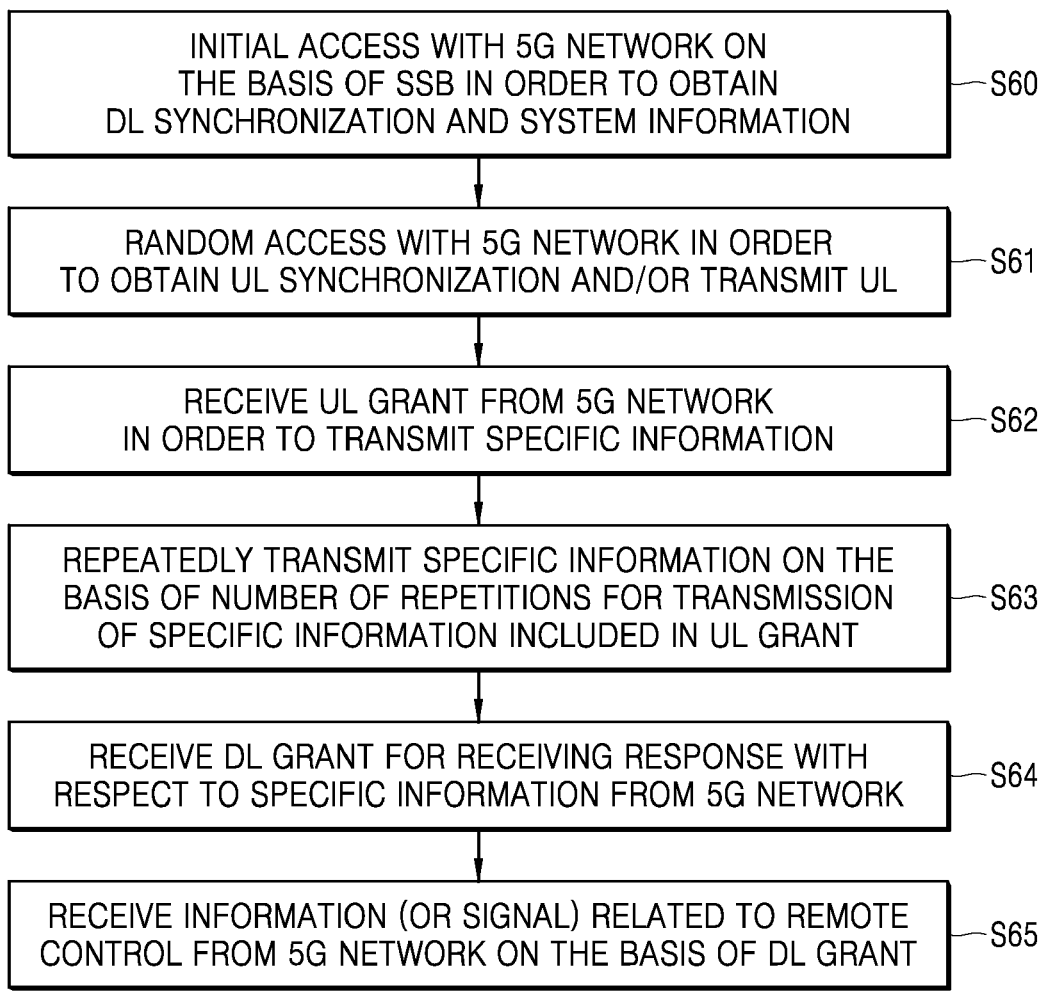

Referring to FIG. 6, a vehicle may perform an initial access procedure with the 5G network on the basis of the SSB in order to obtain DL synchronization and system information (S60).

The vehicle may perform a random access procedure with the 5G network in order to obtain UL synchronization and/or transmit an UL (S61).

The vehicle may receive a UL grant from the 5G network in order to transmit specific information (S62). The UL grant may include information about the number of repetitions for the transmission of the specific information.

The vehicle may repeatedly transmit the specific information on the basis of the information about the number of repetitions for the transmission of the specific information (S63).

The repeated transmission of the specific information may be performed by frequency hopping, first transmission of the specific information may be performed in a first frequency resource, and second transmission of the specific information may be performed in a second frequency resource.

The specific information may be transmitted through a 6 resource block (6RB) narrowband or a 1RB narrowband.

The vehicle may receive a DL grant for receiving a response with respect to the specific information from the 5G network (S64).

The vehicle may receive information (or the signal) related to remote control from the 5G network on the basis of the DL grant (S65).

The 5G communication technology described above may be applied to contents which will be described below and may be supplemented to specify or clarify the technical features of the methods proposed herein.

Figure 7:
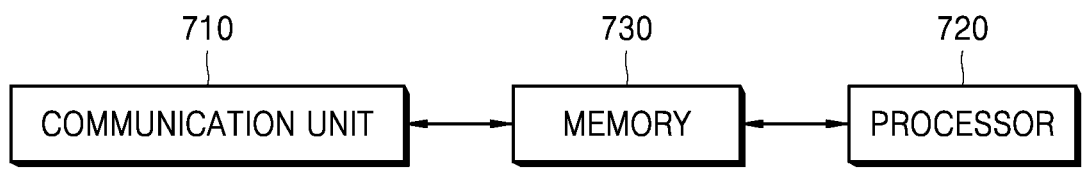
FIG. 7 is a schematic diagram illustrating a configuration of a control server according to an embodiment of the present invention.

FIG. 7 is a schematic diagram illustrating a configuration of a control server according to an embodiment of the present invention.

Referring to FIG. 7, a control server 700 is a device for controlling platooning of two or more autonomous vehicles and includes a communication unit 710, a memory 720, and a processor 730.

Each of the two or more autonomous vehicles is a vehicle that travels without manipulation from the user or with minimal manipulation from the user, as described above. Hereinafter, for convenience of description, the autonomous vehicle will be referred to as a "vehicle."

Hereinafter, a function of each component will be described in detail.

The communication unit 710 is connected and communicates with two or more vehicles. The communication unit 710 is connected and communicates with the two or more vehicles via the 5G network described above.

For example, the communication unit 710 may receive vehicle state information, power loss information, and the like from the two or more vehicles and may transmit a platooning control instruction of the two or more vehicles to the two or more vehicles.

The memory 720 may be a volatile memory and/or a non-volatile memory and store instructions or data related to at least another component of the control server 700. In particular, the memory 720 may store instructions or data related to a computer program or a recording medium for controlling platooning of vehicles.

The processor 730 may include at least one of a central processing unit, an application processor, and a communication processor. The processor 730 may execute operations or data processing related to control and/or communication of at least another component of the control server 700 and execute instructions related to the execution of the computer program.

Hereinafter, embodiments in which a leading vehicle and rear vehicles among two or more vehicles that are desired to perform platooning are determined and embodiments in which an arrangement of the vehicles in the platoon is determined using a wind direction and the like will be described in more detail with reference to the drawings below.

Figure 8:
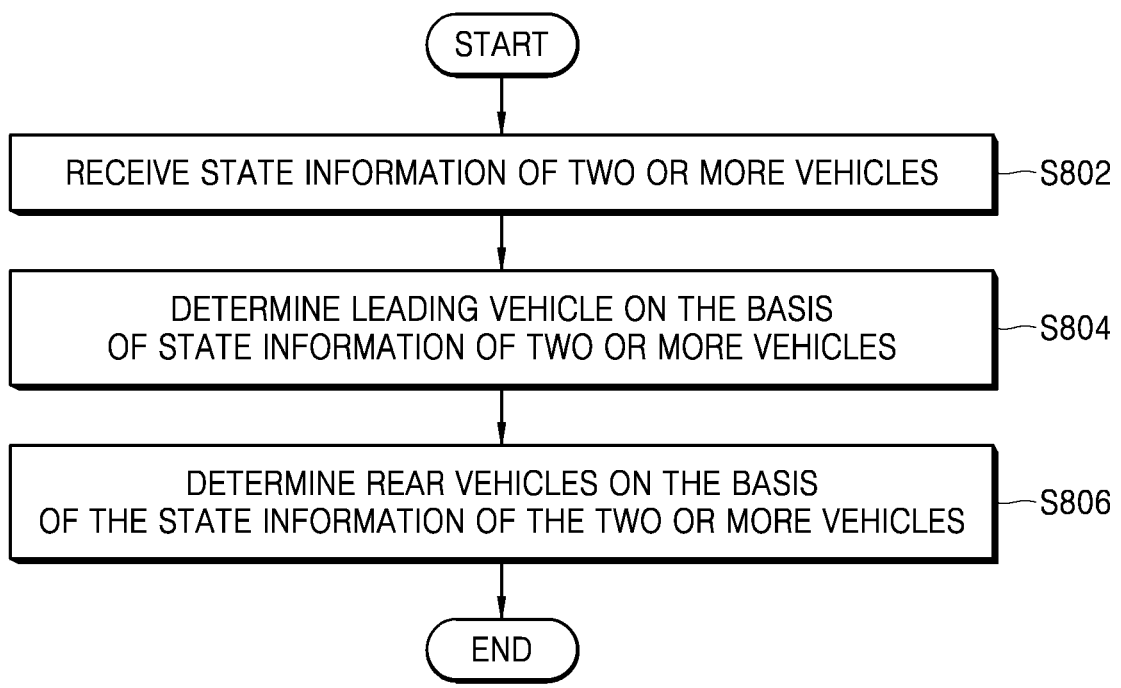
FIG. 8 is a flowchart illustrating a method of determining a leading vehicle in a platoon according to an embodiment of the present invention.

FIG. 8 is a flowchart illustrating a method of determining a leading vehicle in a platoon according to an embodiment of the present invention.

In operation S802, the communication unit 710 receives pieces of state information of two or more vehicles.

Here, the state information of the vehicle may include information about a type of the vehicle, information about whether a wind direction sensor and/or a wind speed sensor is attached, information about the number of different sensors excluding the wind direction sensor and/or the wind speed sensor, information about a weight of the vehicle, and information about a destination of the vehicle.

The information about the type of the vehicle includes a type-A vehicle without a trunk and a type-B vehicle with a separate trunk. For example, the type-A vehicle may be a sport utility vehicle (SUV) or a hatchback, and the type-B vehicle may be a sedan.

The information about whether the wind direction sensor and/or the wind speed sensor is attached is information about whether the wind direction sensor and/or the wind speed sensor is present outside the vehicle.

The information about the number of different sensors is information about the number of sensors excluding the wind direction sensor and/or the wind speed sensor, for example, information about the number of sensors, such as a rider sensor, a radar sensor, the ultrasonic sensor, and the like, which are included in the vehicle.

The information about the weight of the vehicle is calculated based on information about the number of users who boarded the vehicle and information about an amount of remaining fuel of the vehicle.

The information about the destination of the vehicle includes information about a distance between a location of the vehicle and the destination.

In operation S804, the communication unit 710 determines a leading vehicle on the basis of the pieces of state information of the two or more vehicles.

According to an embodiment of the present invention, priorities for determining the leading vehicle are given to various pieces of information included in the state information of the vehicle, and the processor 730 determines the leading vehicle by sequentially applying the pieces of state information to the pieces of information to which the priorities are given. In this case, the priorities are given in order of the information about the type of the vehicle, the information about whether the wind direction sensor and/or the wind speed sensor is attached, the information about the number of different sensors, the information about the weight of the vehicle, and the information about the destination of the vehicle.

The information about the type of the vehicle has a first rank and includes a vehicle type A and a vehicle type B. In this case, a priority of the vehicle type A is higher than a priority of the vehicle type B.

The information about whether the wind direction sensor and/or the wind speed sensor is attached has a second rank and a vehicle to which a wind direction sensor and/or a wind speed sensor is attached has a higher priority than a vehicle to which a wind direction sensor and/or a wind speed sensor is not attached.

The information about the number of different sensors has a third rank and the priority increases as the number of sensors increases.

The information about the weight of the vehicle has a fourth rank and the priority increases as the weight of the vehicle increases.

The information about the destination of the vehicle has a fifth rank and the priority increases as the distance between the location of the vehicle and the destination decreases.

Meanwhile, the information about the type of the vehicle is the most important item to consider in determining of the leading vehicle.

FIG. 9 shows views illustrating concepts of vortexes generated when a type-A vehicle and a type-B vehicle are traveling in series at a high speed.

An air resistance coefficient is referred to as a drag coefficient and is a numerical value of air resistance received when a vehicle travels. As the air resistance coefficient decreases, the vehicle may travel with less force and fuel of the vehicle may be reduced. Generally, when the air resistance coefficient is lowered by 10%, fuel efficiency is improved by 5% at high speed.

When the vehicle is subjected to air resistance, a vortex in which air is turned upside down is generated in the vehicle. In particular, in the case of a type-A vehicle, such as an SUV or a hatchback, air does not flow like water and swirls behind the vehicle. Therefore, when many vortexes are generated, fuel efficiency is low.

Figure 9A:
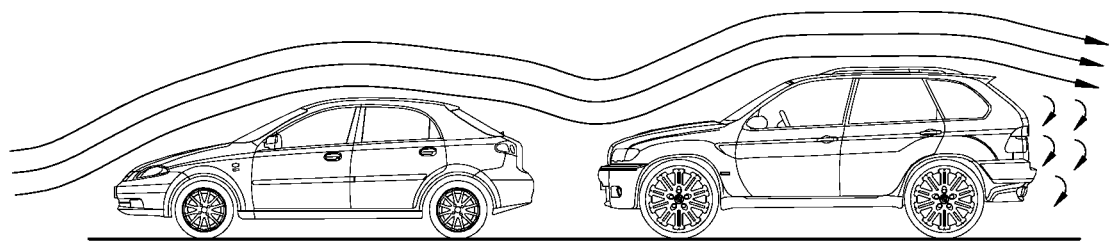
FIG. 9 shows views illustrating concepts of vortexes generated when a type-A vehicle and a type-B vehicle are traveling in series at a high speed.

Meanwhile, referring to FIG. 9A, when the type-B vehicle and the type-A vehicle travel sequentially in a platoon, many vortexes are generated at the rear of the type-A vehicle according to the flow of air. Therefore, the vehicles, in particular, the type-A vehicle, have low fuel efficiency.

Figure 9B:
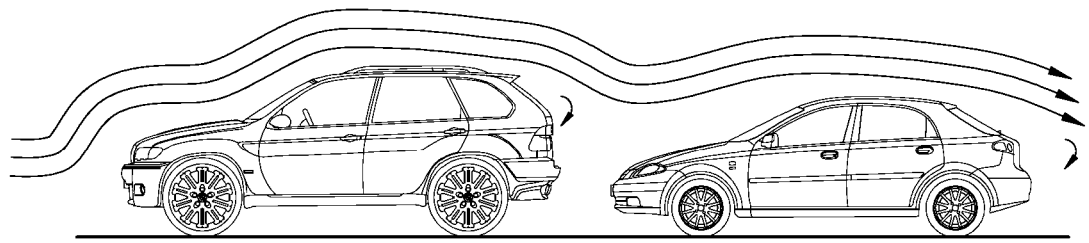

Further, referring to FIG. 9B, when the type-A vehicle and the type-B vehicle travel sequentially in a platoon, air flows from the rear of the type-A vehicle to the type-B vehicle, and many vortexes are not generated at the rear of the type-A vehicle. Therefore, the vehicles, in particular, the type-A vehicle, have high fuel efficiency.

For example, when there is a type-A vehicle among two or more vehicles, the processor 730 determines the type-A vehicle as a leading vehicle. Further, when there are a plurality of type-A vehicles among the two or more vehicles, the processor 730 determines a leading vehicle using pieces of information of second to fifth ranks. Further, when there is no type-A vehicle in the two or more vehicles, the processor 730 determines one of a plurality of type-B vehicles as a leading vehicle using the pieces of information of the second to fifth ranks.

Referring again to FIG. 8, in operation S806, the communication unit 710 determines rear vehicles on the basis of the state information of the two or more vehicles.

That is, referring to the above description of FIGS. 9A and 9B, when the type-A vehicle is located at the rear of the platoon, many vortexes are generated behind the rear vehicle and thus fuel efficiency is reduced. Therefore, when the type-B vehicle is present among the two or more vehicles, the processor 730 determines the type-B vehicle as the rear vehicle.

Figure 10:
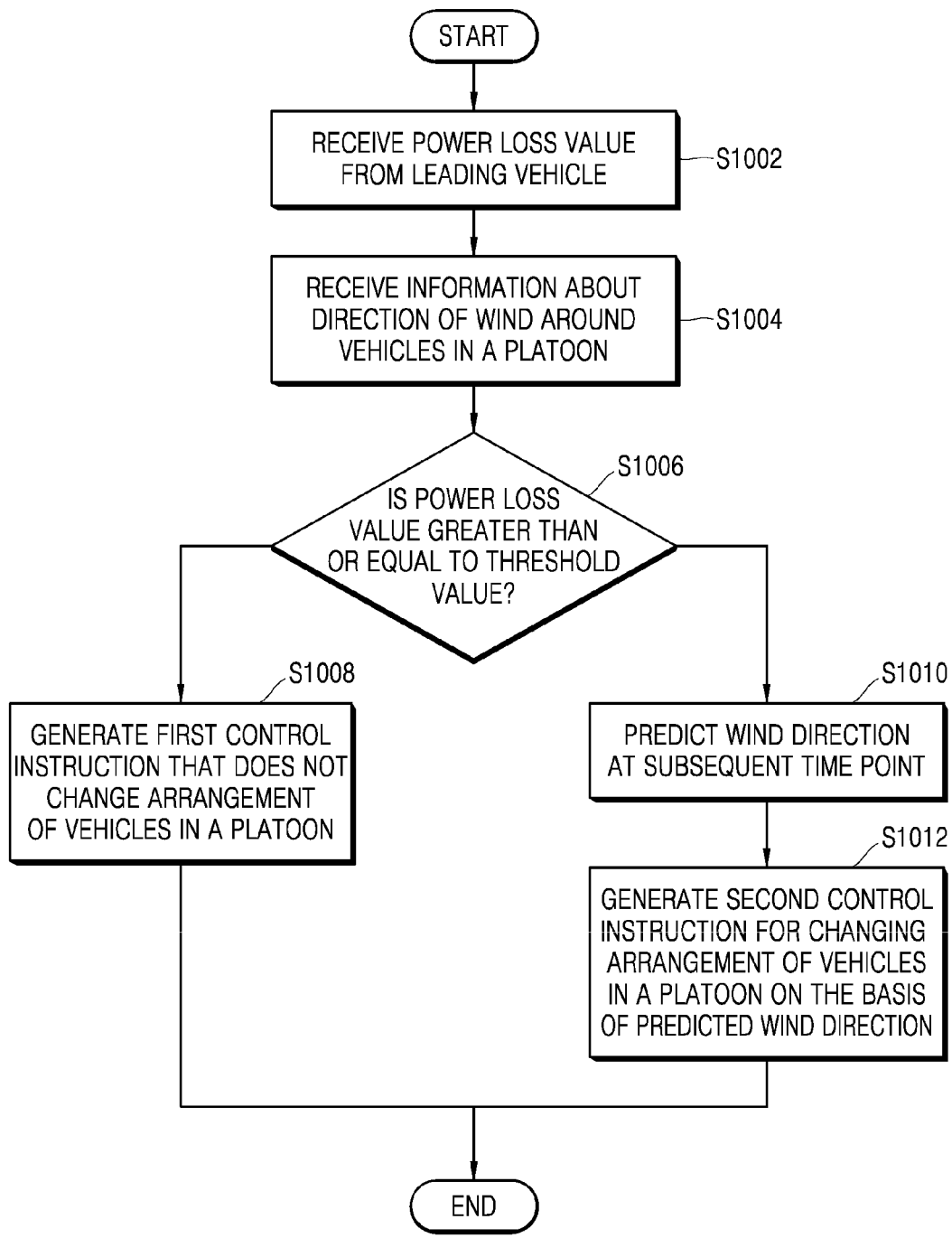
FIG. 10 is a flowchart illustrating a method of determining an arrangement of vehicles performing platooning according to an embodiment of the present invention.

FIG. 10 is a flowchart illustrating a method of determining an arrangement of vehicles performing platooning according to an embodiment of the present invention. Here, descriptions will be made assuming a case in which among a first vehicle, a second vehicle, and a third vehicle travel in a platoon, the first vehicle is a leading vehicle, the second vehicle is an intermediate vehicle, and the third vehicle is a rear vehicle.

In operation S1002, the communication unit 710 receives a power loss value from the leading vehicle.

In this case, power loss may occur due to the influence of wind.

Further, the power loss value may be a value calculated in the first vehicle on the basis of a difference between an expected speed of the first vehicle and a current speed of the first vehicle.

The expected speed may refer to a speed that can be expected based on a driving state of the first vehicle and may be calculated by at least one piece of information among information about a gear ratio of the first vehicle, information about revolutions per minute (RPM), information about a weight of the vehicle, and information about an inclination of a road on which the first vehicle travels. Further, the current speed may be calculated by the number of turns of a wheel of the first vehicle, a speed sensor, and the like.

Further, the power loss value may be a percentage value based on a difference between the expected speed of the first vehicle and the current speed of the first vehicle as a numerator and the expected speed of the first vehicle as a denominator.

In operation S1004, the communication unit 710 receives information about a direction of wind around the vehicles in a platoon.

In this case, the vehicle which has a wind direction sensor and/or a wind speed sensor among the first vehicle, the second vehicle, and the third vehicle may receive the information about the wind direction. Meanwhile, when no wind direction sensor and/or wind speed sensor is provided in the first vehicle, the second vehicle, or the third vehicle, a server provided in the weather center may receive the information about the wind direction.

In operation S1006, the processor 730 determines whether the power loss value is greater than or equal to a preset threshold value. In this case, the threshold value may be determined experimentally. According to an embodiment of the present invention, the threshold value may be a value of at least 10%.

In operation S1008, when the power loss value is less than the threshold value, the processor 730 generates a first control instruction that does not change an arrangement of vehicles in a platoon.

That is, when the power loss value is small, fuel efficiency is not greatly reduced due to wind, but rather more fuel may be consumed to change the arrangement of the vehicles in the platoon. Therefore, the vehicles performing the platooning do not change the arrangement.

On the other hand, when the power loss value is greater than or equal to the threshold value, the processor 730 generates a second control instruction that changes an arrangement of vehicles in a platoon.

More specifically, in operation S1010, the processor 730 predicts the wind direction at a subsequent time point on the basis of the wind direction and the type of the road on which the vehicles perform the platooning travel, which are received in operation S1004. In this case, the type of the road on which the vehicles travel may be obtained based on a navigation map.

Meanwhile, the predicted wind direction may be any one of a reverse wind direction, a rear wind direction, a side wind direction, and a diagonal wind direction.

Figure 11:
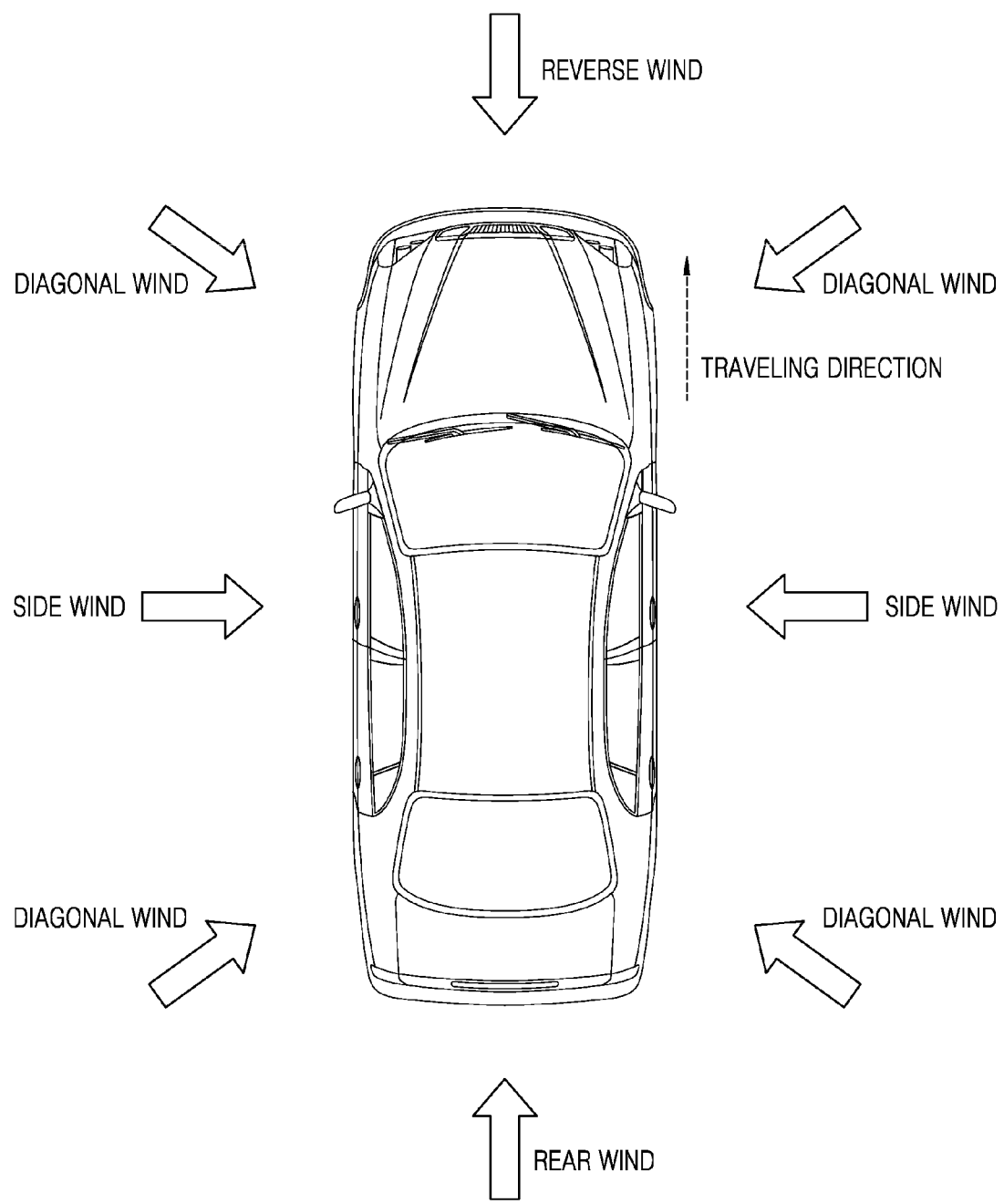
FIG. 11 is a view illustrating a concept of wind directions.

FIG. 11 is a view illustrating a concept of the wind directions.

Reverse wind is wind blowing in a direction opposite to a traveling direction of the first vehicle.

Rear wind is wind blowing in the same direction as the traveling direction of the first vehicle.

Side wind is wind blowing in a direction at a right angle with respect to the traveling direction of the first vehicle.

Diagonal wind is wind blowing in a diagonal direction with respect to the traveling direction of the first vehicle.

Further, in operation S1012, the processor 730 generates the second control instruction for controlling the arrangement of the vehicles in a platoon on the basis of the predicted wind direction. The vehicles in a platoon change the arrangement of the vehicles in the platoon using the second control instruction.

Hereinafter, examples in which an arrangement of vehicles in a platoon is changed will be described in detail for each situation.

1. First Situation

A situation may be present in which, before an arrangement of vehicles in a platoon is changed, a first vehicle A, a second vehicle B, and a third vehicle C travel in series in a first lane of a straight road, an expected direction of wind around the vehicles is side wind, and a type of the road is straight.

In this case, the processor 730 may generate a second control instruction to cause the first vehicle A to travel in the first lane and the second vehicle B and the third vehicle C to travel in series in a second lane adjacent to the first lane. In this case, the first vehicle A, the second vehicle B, and the third vehicle C may be disposed at vertices of a regular triangle. The above situation is as shown in FIG. 12.

Figure 12:
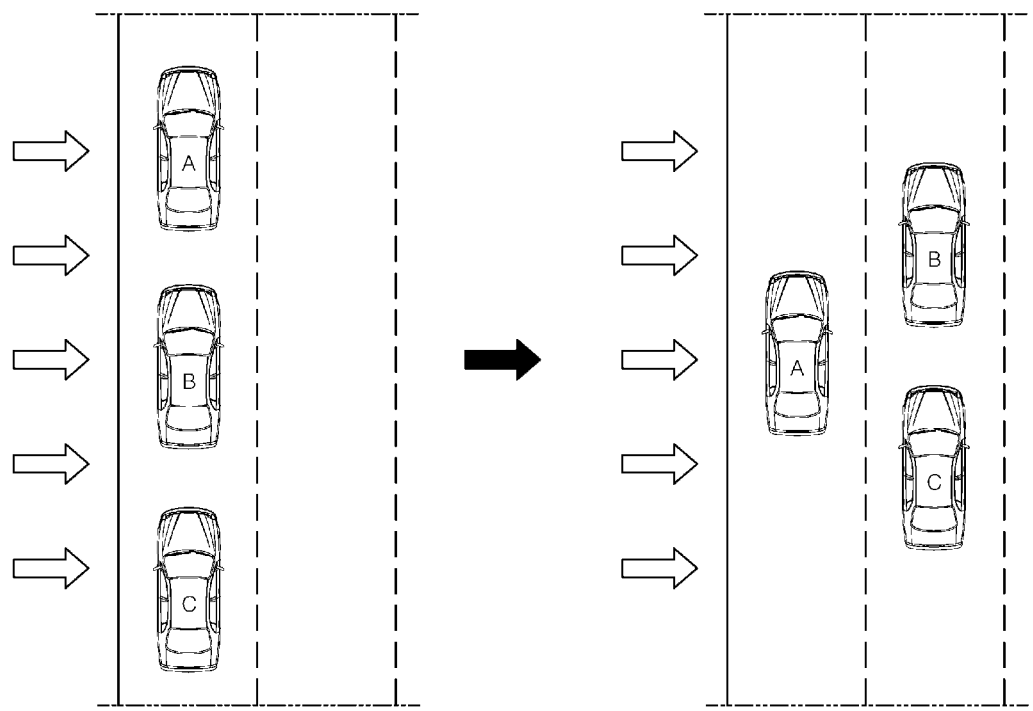
FIGS. 12 to 16 are views illustrating concepts in which an arrangement of vehicles in a platoon according to an embodiment of the present invention is changed.

Referring to FIG. 12, when side wind blows on the vehicles traveling in series on the straight road, the second vehicle B and the third vehicle C move in a direction opposite to the direction in which the wind blows. In this case, the first vehicle A blocks the side wind so that a portion of the second vehicle B and a portion of the third vehicle C do not get hit by the wind. Therefore, the influence of the wind is minimized and total fuel efficiency of the vehicles in the platoon is improved.

2. Second Situation

A situation may be present in which, before an arrangement of vehicles in a platoon is changed, a first vehicle A, a second vehicle B, and a third vehicle C travel in series in a first lane of a straight road, an expected direction of wind around the vehicles is diagonal wind, and a type of the road is straight.

In this case, the processor 730 may generate a second control instruction to cause the first vehicle A and the second vehicle B to travel in series in the first lane and the third vehicle C to travel in a second lane adjacent to the first lane. In this case, an angle between the first vehicle A and the third vehicle C which are located at vertices of a triangle may be equal to an angle of the diagonal wind. The above situation is as shown in FIG. 13.

Figure 13:
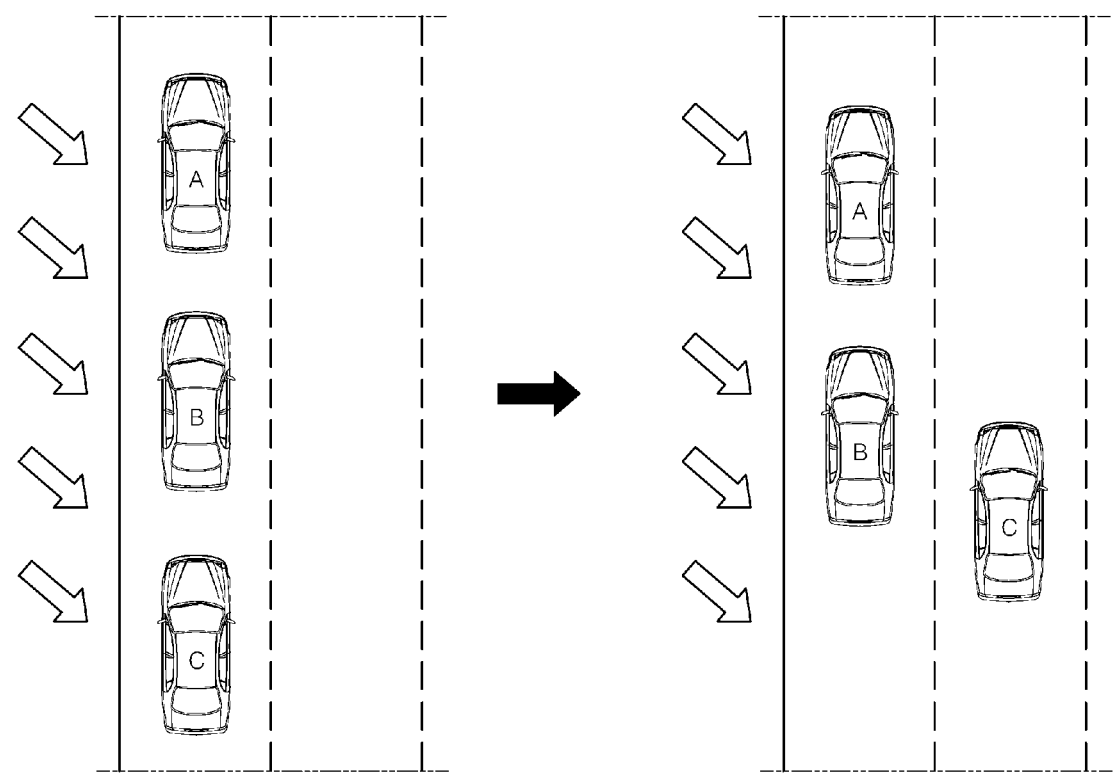

Referring to FIG. 13, when the diagonal wind blows on the vehicles traveling in series on the straight road, the third vehicle C moves in a direction opposite to the direction in which the wind blows. In this case, the first vehicle A and the second vehicle B block the diagonal wind so that the third vehicle C does not get hit by the wind. Therefore, the influence of the wind is minimized and total fuel efficiency of the vehicles in the platoon is improved.

3. Third Situation

A situation may be present in which, before an arrangement of vehicles in a platoon is changed, a first vehicle A, a second vehicle B, and a third vehicle C travel in series in a first lane of a straight road, an expected direction of wind around the vehicles is reverse wind, and a type of the road is curved.

In this case, the processor 730 may generate a second control instruction to cause the first vehicle A and the second vehicle B to travel in series in the first lane and the third vehicle C to travel in a second lane adjacent to the first lane. In this case, an angle between the first vehicle A and the third vehicle C which are located at vertices of a triangle may be equal to an angle of diagonal wind. The above situation is as shown in FIG. 14.

Figure 14:
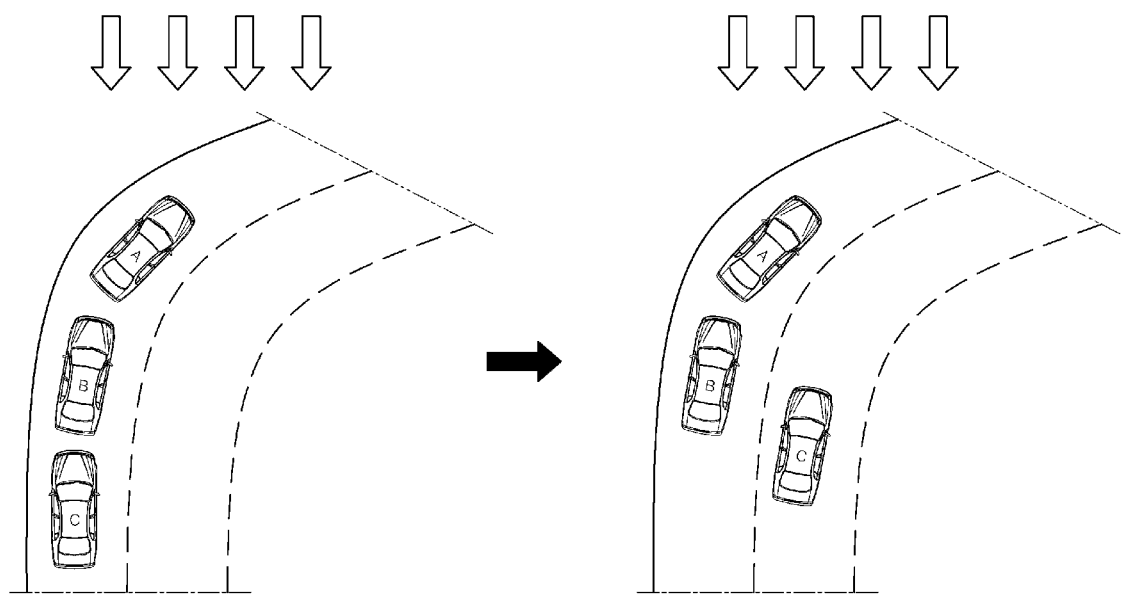

Referring to FIG. 14, the reverse wind on the straight road is similar to the diagonal wind blowing on a curved road. Therefore, similarly to the second situation, the third vehicle C moves to the second lane, and the first vehicle A and the second vehicle B block the wind so that the third vehicle C does not get hit by the wind. Therefore, the influence of the wind is minimized and total fuel efficiency of the vehicles in the platoon is improved.

4. Fourth Situation

A situation in which, before an arrangement of vehicles in a platoon is changed, some vehicles among a first vehicle A, a second vehicle B, and a third vehicle C travel in a first lane of a straight road, the remaining vehicle travels in a second lane adjacent to the first lane, an expected direction of wind around the vehicles is side wind, and a type of the road is curved may be present.

In this case, the processor 730 may generate a second control instruction to cause the first vehicle A, the second vehicle B, and the third vehicle C to travel in series in any one lane of the first lane and the second lane on a curved road. In this case, the any one lane may be a lane furthest from a direction in which the side wind blows. The above situation is as shown in FIGS. 15 and 16.

Figure 15:
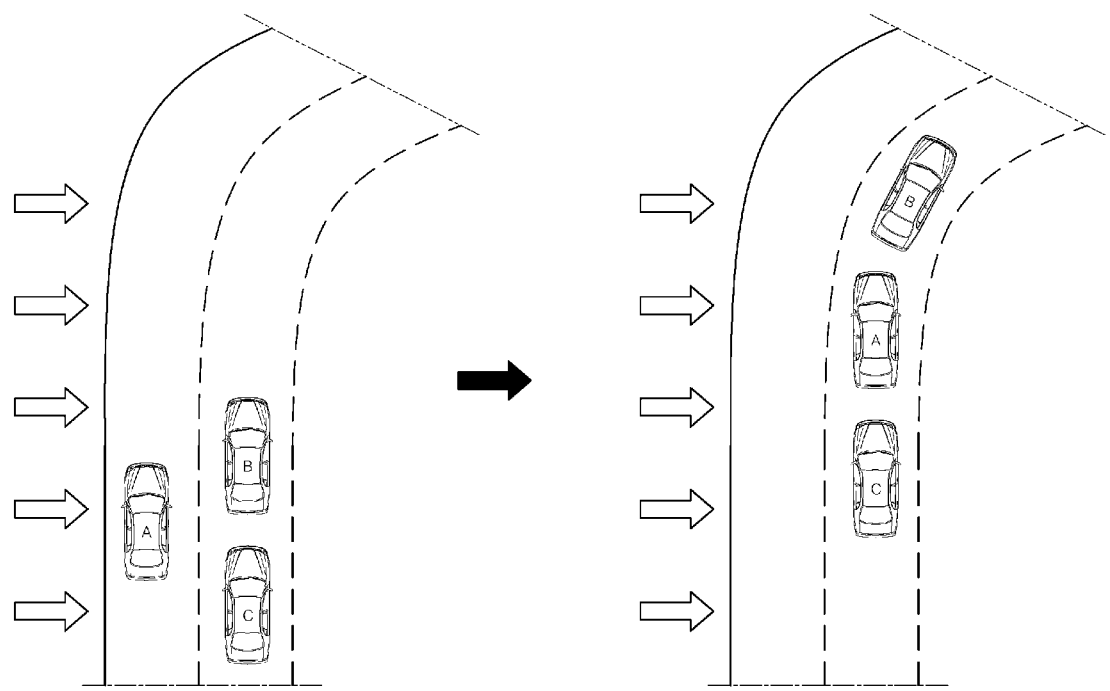

Referring to FIG. 15, before an arrangement of vehicles in a platoon is changed, a first vehicle A travels in a first lane and a second vehicle B and a third vehicle C travel in series in a second lane. In this case, when side wind blows in a direction opposite to an exit direction of a curved road, the processor 730 may control to allow the first vehicle A to enter between the second vehicle B and the third vehicle C so that the second vehicle B, the first vehicle A, and the third vehicle C travel in series. Subsequently, when the second vehicle B, the first vehicle A, and the third vehicle C exit the curved road, rear wind blows on the second vehicle B, the first vehicle A, and the third vehicle C. In this case, the influence of the wind is minimized and thus fuel efficiency is improved.

Figure 16:
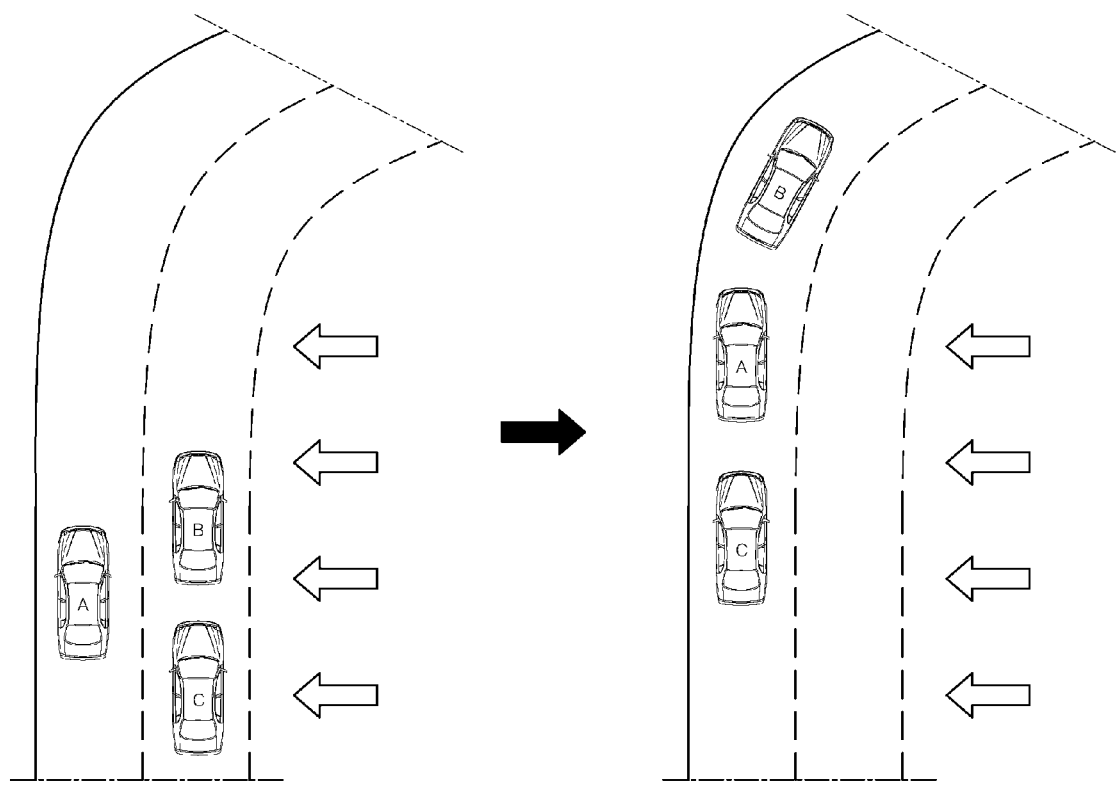

Further, referring to FIG. 16, before an arrangement of vehicles in a platoon is changed, a first vehicle A travels in a first lane and a second vehicle B and a third vehicle C travel in series in a second lane. In this case, when side wind blows in an exit direction of a curved road, the processor 730 may control to allow the second vehicle B and the third vehicle C to enter in front of and behind the first vehicle A, respectively, so that the second vehicle B, the first vehicle A, and the third vehicle C travel in series. In this case, the influence of the wind is minimized and thus fuel efficiency is improved.

In summary, in the method of controlling the platooning of the present invention, the arrangement of the vehicles in the platoon may be adjusted so that the vehicles performing the platooning do get hit by wind, and accordingly, fuel efficiency may be improved.

While the above-described embodiments of the invention describe that all components are combined into one unit or are operated in a combined manner, the invention is not limited thereto. That is, within the scope of the invention, at least one of the components may be selectively combined and operated. Although all of the components may each be implemented as a single independent piece of hardware, some or all components may be selectively combined and implemented as a computer program having a program module that performs some or all functions combined in a single hardware device or a plurality of hardware devices. Such a computer program is stored in computer readable media and is read and executed by a computer, and thus the embodiment of the invention may be implemented. Examples of computer program recording media may include magnetic recording media, optical recording media, and carrier wave media. In addition, computer programs that implement the embodiment of the present invention include a program module that is transmitted in real time through an external device.

According to the present invention, fuel efficiency of a plurality of autonomous vehicles performing platooning can be improved by efficiently changing an arrangement of the vehicles in the platoon on the basis of a wind direction, a type of road, and the like.

Effects of the present invention are not limited to the above effects, and those skilled in the art can easily derive various effects of the present invention from the configuration of the present invention.

While the present invention has been particularly described with reference to the embodiments, it will be understood by those skilled in the art that various changes and modifications may be made. Therefore, it will be understood that the changes and modifications are included within the scope of the present invention without departing from the spirit and scope of the present invention.

What is claimed is:

1. A control server comprising:
   a communication unit configured to communicate with two or more autonomous vehicles which travel in a platoon;
   a memory configured to store one or more instructions; and
   a processor configured to execute the instructions,
   wherein the communication unit receives vehicle state information for each of the two or more vehicles from the two or more vehicles, and the vehicle state information includes a plurality of information to which priority information is given,
   wherein the processor determines a leading vehicle among the two or more vehicles on the basis of the plurality of information,
   wherein the communication unit receives a power loss value from the leading vehicle and receives information about a direction of wind around the two or more vehicles from at least one vehicle among the two or more vehicles or an external server,
   wherein, when the power loss value is greater than or equal to a preset threshold value, the processor predicts a direction of wind at a subsequent time point on the basis of the received wind direction and a type of road on which the two or more vehicles travel and generates a control instruction for controlling an arrangement of the two or more vehicles in the platoon on the basis of the predicted wind direction, and
   the communication unit transmits the control instruction to the two or more vehicles,
   wherein the processor generates a control instruction A in case that driving situation of the two or more autonomous vehicles is a situation A,
   wherein, in the situation A, the two or more vehicles include a first, a second and a third vehicle, and before the arrangement is changed, some vehicles among the first, the second and the third vehicle travel in series in a first lane of a straight road and the remaining vehicle travels in a second lane adjacent to the first lane, and the type of the road is curved, and the expected direction of wind around the vehicles is side wind with respect to a traveling direction of the first vehicle,
   wherein, the control instruction A is a control instruction to cause the first, the second, and the third vehicle to travel in series in any one lane of the first lane and the second lane of a curved road, and
   the any one lane is a lane furthest from a direction in which the side wind blows.

2. The control server of claim 1, wherein the power loss value is a value calculated based on a difference between an expected speed of the leading vehicle and a current speed of the leading vehicle.

3. The control server of claim 2, wherein the expected speed of the leading vehicle is a value calculated based on at least one of information about a gear ratio of the leading vehicle, information about revolutions per minute (RPM), information about a weight of the vehicle, and information about an inclination of a road on which the leading vehicle travels.

4. The control server of claim 2, wherein:
   the power loss value is a percentage value wherein a numerator of the power loss value is the difference between the expected speed and the current speed, the denominator of the power loss value is the expected speed, and
   the threshold value is a value of at least 10%.

5. The control server of claim 1, wherein:
   the processor generates a control instruction B in case that driving situation of the two or more autonomous vehicles is a situation B,
   wherein, in the situation B, the two or more vehicles include the first, the second, and the third vehicle, and before the arrangement is changed, the first, the second, and the third vehicle travel in series in a first lane of a straight road, and
   the type of the road is straight, and the expected direction of wind around the vehicles is side wind with respect to a traveling direction of the first vehicle,
   wherein, the control instruction B is a control instruction to cause the first vehicle to travel in the first lane and the second vehicle and the third vehicle to travel in series in a second lane adjacent to the first lane.

6. The control server of claim 1, wherein:
   the processor generates a control instruction C in case that driving situation of the two or more autonomous vehicles is a situation C,
   wherein, in the situation C, the two or more vehicles include the first, the second, and the third vehicle, and before the arrangement is changed, the first, the second, and the third vehicle travel in series in a first lane of a straight road, and
   the type of the road is straight, and the expected direction of wind around the vehicles is diagonal wind with respect to a traveling direction of the first vehicle,
   wherein, the control instruction C is a control instruction to cause the first vehicle and the second vehicle to travel in series in the first lane and the third vehicle to travel in a second lane adjacent to the first lane.

7. The control server of claim 1, wherein:
   the processor generates a control instruction D in case that driving situation of the two or more autonomous vehicles is a situation D,
   wherein, in the situation D, the two or more vehicles include the first, the second, and the third vehicle, and before the arrangement is changed, the first, the second, and the third vehicle travel in series in a first lane of a straight road, and
   the type of the road is curved, and the expected direction of wind around the vehicles is reverse wind with respect to a traveling direction of the first vehicle,
   wherein, the control instruction D is a control instruction to cause the first vehicle and the second vehicle to travel in series in the first lane and the third vehicle to travel in a second lane adjacent to the first lane.

8. The control server of claim 1, wherein:
   the vehicle state information includes information about a type of the vehicle, information about whether a wind direction sensor and/or a wind speed sensor is attached, information about the number of different sensors excluding the wind direction sensor and/or the wind speed sensor, information about a weight of the vehicle, and information about a destination of the vehicle.

9. The control server of claim 8, wherein the priority information which determine the leading vehicle are given in order of the information about the type of the vehicle, the information about whether the wind direction sensor and/or the wind speed sensor is attached, the information about the number of different sensors excluding the wind direction sensor and/or the wind speed sensor, the information about the weight of the vehicle, and the information about the destination of the vehicle.

10. The control server of claim 9, wherein the information about the type of the vehicle includes a vehicle type A without a trunk and a vehicle type B with a separate trunk, wherein a priority of the vehicle type A is higher than a priority of the vehicle type B.

11. The control server of claim 1, wherein the communication unit transmits the control instruction to the two or more vehicles via a fifth generation (5G) network.

12. The control server of claim 11, wherein:
a communication connection procedure between the communication unit and the two or more vehicles via the 5G network includes an initial access procedure, a random access procedure, an uplink (UL) grant transmission and reception procedure, and a downlink (DL) grant transmission, and
the communication unit performs the communication connection procedure and then transmits the control instruction to the two or more vehicles.

13. A method of controlling platooning of two or more autonomous vehicles which is performed in a device including a communication unit and a processor, the method comprising:
receiving, by the communication unit, vehicle state information of the two or more vehicles wherein the vehicle state information includes a plurality of information to which priority information is given;
determining, by the processor, a leading vehicle among the two or more vehicles on the basis of the plurality of information;
receiving, by the communication unit, a power loss value from the leading vehicle and receiving information about a direction of wind around the two or more vehicles from at least one vehicle of the two or more vehicles or an external server;
predicting, by the processor, a wind direction at a subsequent time point on the basis of the received wind direction and a type of road on which the two or more vehicles travel, when the power loss value is greater than or equal to a preset threshold value;
generating, by the processor, a control instruction for changing an arrangement of the two or more vehicles in the platoon on the basis of the predicted wind direction; and
transmitting, by the communication unit, the control instruction to the two or more vehicles,
the generating of the control instruction includes generating a control instruction A in case that driving situation of the two or more autonomous vehicles is situation A,
wherein, in the situation A, the two or more vehicles include a first, a second and a third vehicle, and before the arrangement is changed, some vehicles among the first, the second and the third vehicle travel in series in a first lane of a straight road and the remaining vehicle travels in a second lane adjacent to the first lane, and the type of the road is curved, and the expected direction of wind around the vehicles is side wind with respect to a traveling direction of the first vehicle,
wherein, the control instruction A is a control instruction to cause the first, the second, and the third vehicle to travel in series in any one lane of the first lane and the second lane of a curved road, and
the any one lane is a lane furthest from a direction in which the side wind blows.

14. The method of claim 13, wherein:
the generating of the control instruction includes generating a control instruction B in case that driving situation of the two or more autonomous vehicles is situation B,
wherein, in the situation B, the two or more vehicles include the first, the second, and a third vehicle, and before the arrangement is changed, the first, the second, and the third vehicle travel in series in a first lane of a straight road, and
the type of the road is straight, and the expected direction of wind around the vehicles is side wind with respect to a traveling direction of the first vehicle,
wherein, the control instruction B is a control instruction to cause the first vehicle to travel in the first lane and the second vehicle and the third vehicle to travel in series in a second lane adjacent to the first lane.

15. The method of claim 13, wherein:
the generating of the control instruction includes generating a control instruction C in case that driving situation of the two or more autonomous vehicles is situation C,
wherein, in the situation C, the two or more vehicles include the first, the second, and the third vehicle, and before the arrangement is changed, the first, the second, and the third vehicle travel in series in a first lane of a straight road, and
the type of the road is straight, and the expected direction of wind around the vehicles is diagonal wind with respect to a traveling direction of the first vehicle,
wherein, the control instruction C is a control instruction to cause the first vehicle and the second vehicle to travel in series in the first lane and the third vehicle to travel in a second lane adjacent to the first lane.

16. The method of claim 13, wherein:
the generating of the control instruction includes generating a control instruction D in case that driving situation of the two or more autonomous vehicles is situation D,
wherein, in the situation D, the two or more vehicles include the first, the second, and the third vehicle, and before the arrangement is changed, the first, the second, and the third vehicle travel in series in a first lane of a straight road, and
the type of the road is curved, and the expected direction of wind around the vehicles is reverse wind with respect to a traveling direction of the first vehicle,
wherein, the control instruction D is a control instruction to cause the first vehicle and the second vehicle to travel in series in the first lane and the third vehicle to travel in a second lane adjacent to the first lane.

17. The method of claim 13, wherein:
the vehicle state information includes information about a type of the vehicle, information about whether a wind direction sensor and/or a wind speed sensor is attached, information about the number of different sensors excluding the wind direction sensor and/or the wind speed sensor, information about a weight of the vehicle, and information about a destination of the vehicle; and the priority information which determine the leading vehicle are given in order of the information about the type of the vehicle, the information about whether the wind direction sensor and/or the wind speed sensor is attached, the information about the number of different sensors excluding the wind direction sensor and/or the wind speed sensor, the information about the weight of the vehicle, and the information about the destination of the vehicle.

18. The method of claim 17, wherein the information about the type of the vehicle includes a vehicle type A without a trunk and a vehicle type B with a separate trunk, wherein a priority of the vehicle type A is higher than a priority of the vehicle type B.

* * * * *